(12) United States Patent
Smith

(10) Patent No.: US 7,667,433 B1
(45) Date of Patent: Feb. 23, 2010

(54) RECHARGING COVER SYSTEM

(76) Inventor: Steven D. Smith, 1070 Calvary Chrurch Rd., Sanford, NC (US) 27332

( * ) Notice: Subject to any disclaimer, the term of this patent is extended or adjusted under 35 U.S.C. 154(b) by 355 days.

(21) Appl. No.: 11/690,536

(22) Filed: Mar. 23, 2007

(51) Int. Cl.
*H01M 10/46* (2006.01)
(52) U.S. Cl. .................................... 320/115
(58) Field of Classification Search ................ 320/101, 320/107, 112, 114, 115
See application file for complete search history.

(56) References Cited

U.S. PATENT DOCUMENTS

| | | |
|---|---|---|
| 3,463,994 A * | 8/1969 | Spohr .......................... 320/115 |
| 5,822,427 A | 10/1998 | Braitberg et al. |
| 6,182,878 B1 | 2/2001 | Racca |
| 6,268,709 B1 | 7/2001 | Lee et al. |
| 6,454,146 B2 | 9/2002 | Alis |
| 6,674,358 B1 | 1/2004 | Tinsley |
| 6,977,479 B2 | 12/2005 | Hsu |
| 7,062,300 B1 | 6/2006 | Kim |
| 2005/0285561 A1 | 12/2005 | Cheek |

* cited by examiner

*Primary Examiner*—Edward Tso

(57) ABSTRACT

A recharging cover system for storing, protecting and recharging an electronic device during transport of the electronic device includes a case receives the electronic device to protect the electronic device from being inadvertently damaged. A recharging assembly is positioned in the case. The recharging assembly is electrically coupled to the electronic device to recharge the electronic device when the electronic device is positioned in the case.

15 Claims, 5 Drawing Sheets

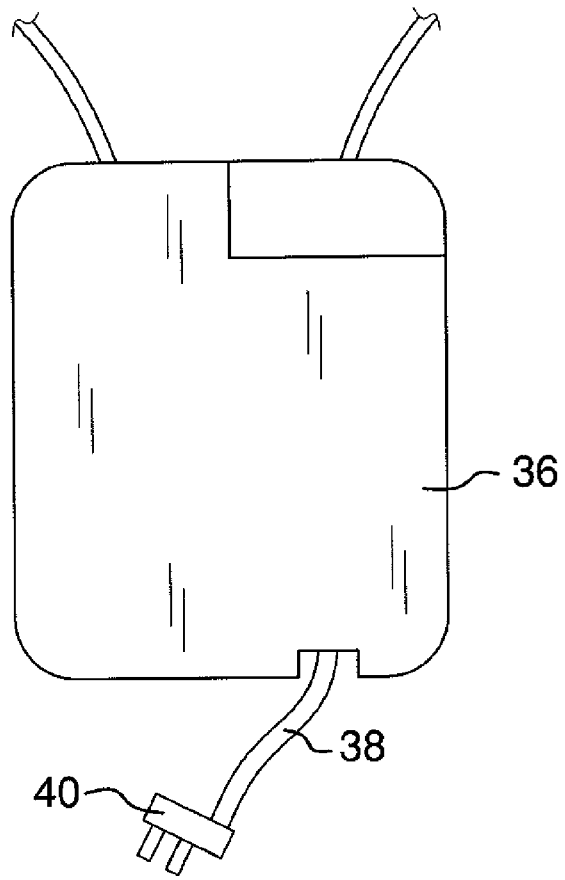
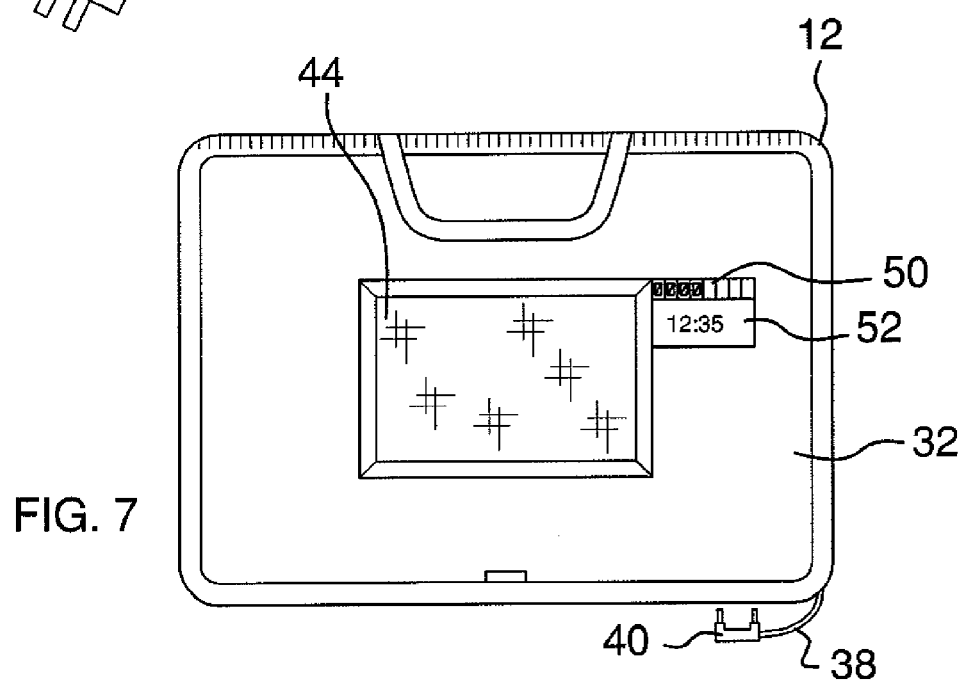

RECHARGING COVER SYSTEM

BACKGROUND OF THE INVENTION

1. Field of the Invention

The present invention relates to portable cell phone battery chargers and more particularly pertains to a new portable cell phone battery charger for storing, protecting and recharging an electronic device during transport of the electronic device.

2. Description of the Prior Art

The use of portable cell phone battery chargers is known in the prior art. While these devices fulfill their respective, particular objectives and requirements, the need remains for a system that has certain improved features that allow the system to be recharged from exposure to light. Additionally, the system should a way to indicate the amount of power remaining in the system to recharge an electronic device.

SUMMARY OF THE INVENTION

The present invention meets the needs presented above by generally comprising a case receives the electronic device to protect the electronic device from being inadvertently damaged. A recharging assembly is positioned in the case. The recharging assembly is electrically coupled to the electronic device to recharge the electronic device when the electronic device is positioned in the case.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a front view of the batter pack of the present invention removed from the case.

FIG. 7 is a top view of an embodiment of the present invention used for laptop computers.

DESCRIPTION OF THE PREFERRED EMBODIMENT

Figure 1:
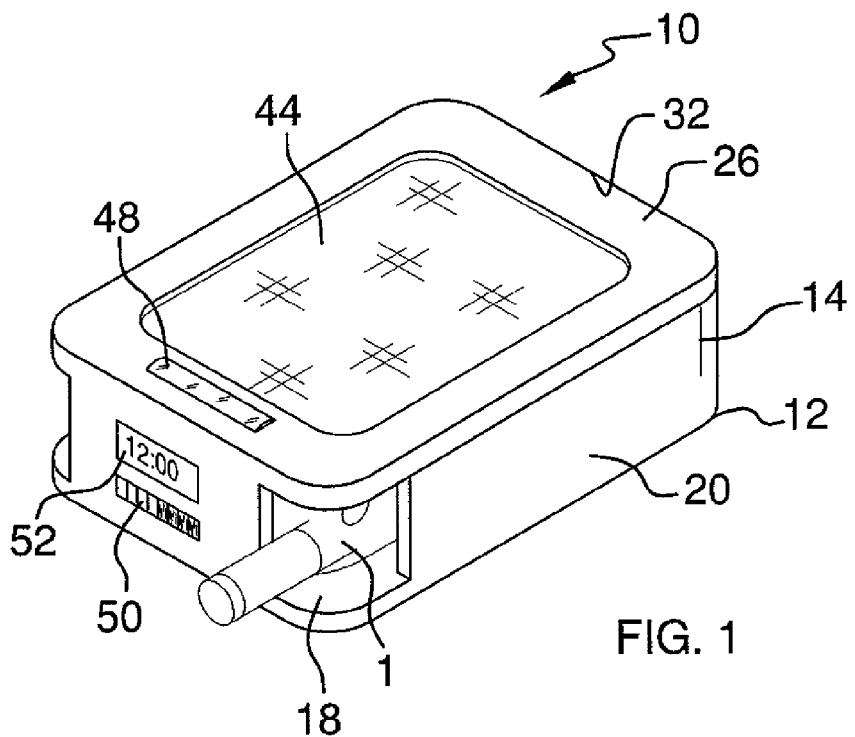
FIG. 1 is a top perspective view of a recharging cover system according to the present invention shown in use with a cellular phone.

With reference now to the drawings, and in particular to FIGS. 1 through 8 thereof, a new portable cell phone battery charger embodying the principles and concepts of the present invention and generally designated by the reference numeral 10 will be described.

As best illustrated in FIGS. 1 through 8, the recharging cover system 10 generally comprises a case 12 receiving an electronic device 1, such as a cellular phone, portable music players, pagers and laptop computers, to protect the electronic device 1 from being inadvertently damaged. The case 12 includes a sleeve 14 receiving the electronic device 1. The sleeve 14 includes a front wall 16, a back wall 18 and a perimeter wall 20 extending between the front wall 16 and the back wall 18 to define an interior space 22 to receive the electronic device 1. The sleeve 14 has an open top end 24 to permit insertion of the electronic device 1 into the interior space 22 of the case 12.

The case 12 includes a cover 26 hingedly coupled to the back wall 18. The cover 26 is pivoted over the open top end 24 and positioned adjacent the front wall 16 when the electronic device 1 is to be secured in the case 12. A first portion of hook and loop fastener 28 is coupled to the front wall 16 of the case 12. A second portion of hook and loop fastener 30 is coupled to the cover 26 adjacent a free end 32 of the cover 26. The first portion of hook and loop fastener 28 is releasably secured to the second portion of hook and loop fastener 30 to secure the cover 26 over the front the front wall 16.

A recharging assembly 34 is positioned in the case 12. The recharging assembly 34 is electrically coupled to the electronic device 1 to recharge the electronic device 1 when the electronic device 1 is positioned in the case 12. The recharging assembly 34 includes a battery pack 36 positioned in the case 12. The battery pack 36 is electrically coupled to the electronic device 1 to recharge the electronic device 1. A connecting cable 38 is electrically coupled to the battery pack 36. The connecting cable 38 extends from the case 12. A free end 40 of the connecting cable 38 is inserted through an aperture 42 in the perimeter wall 20 and electrically coupled to the electronic device 1 to allow power to be transferred from the battery pack 36 to the electronic device 1.

Figure 2:
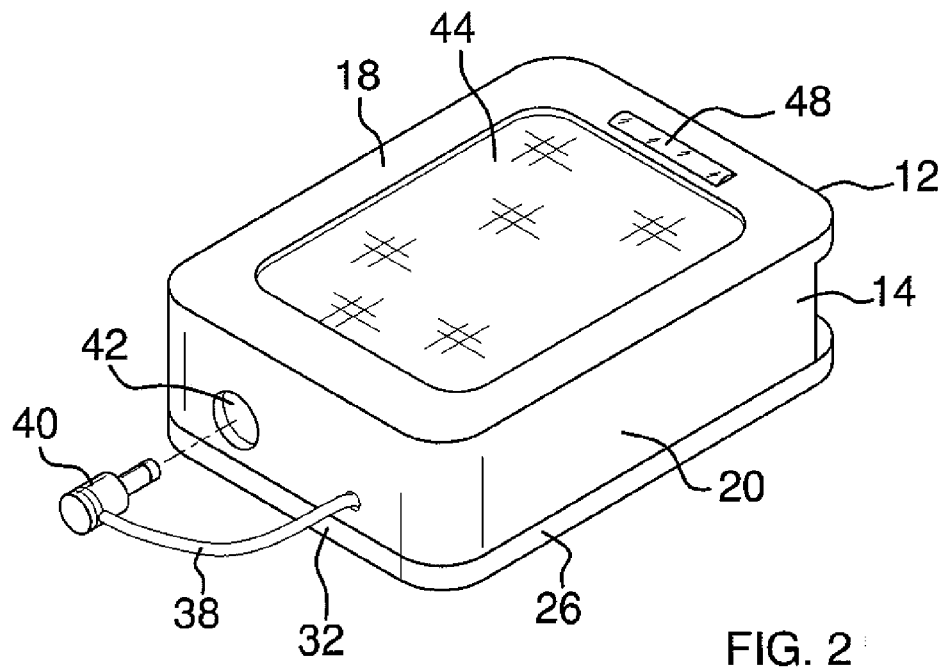
FIG. 2 is a bottom perspective view of the present invention.
Figure 3:
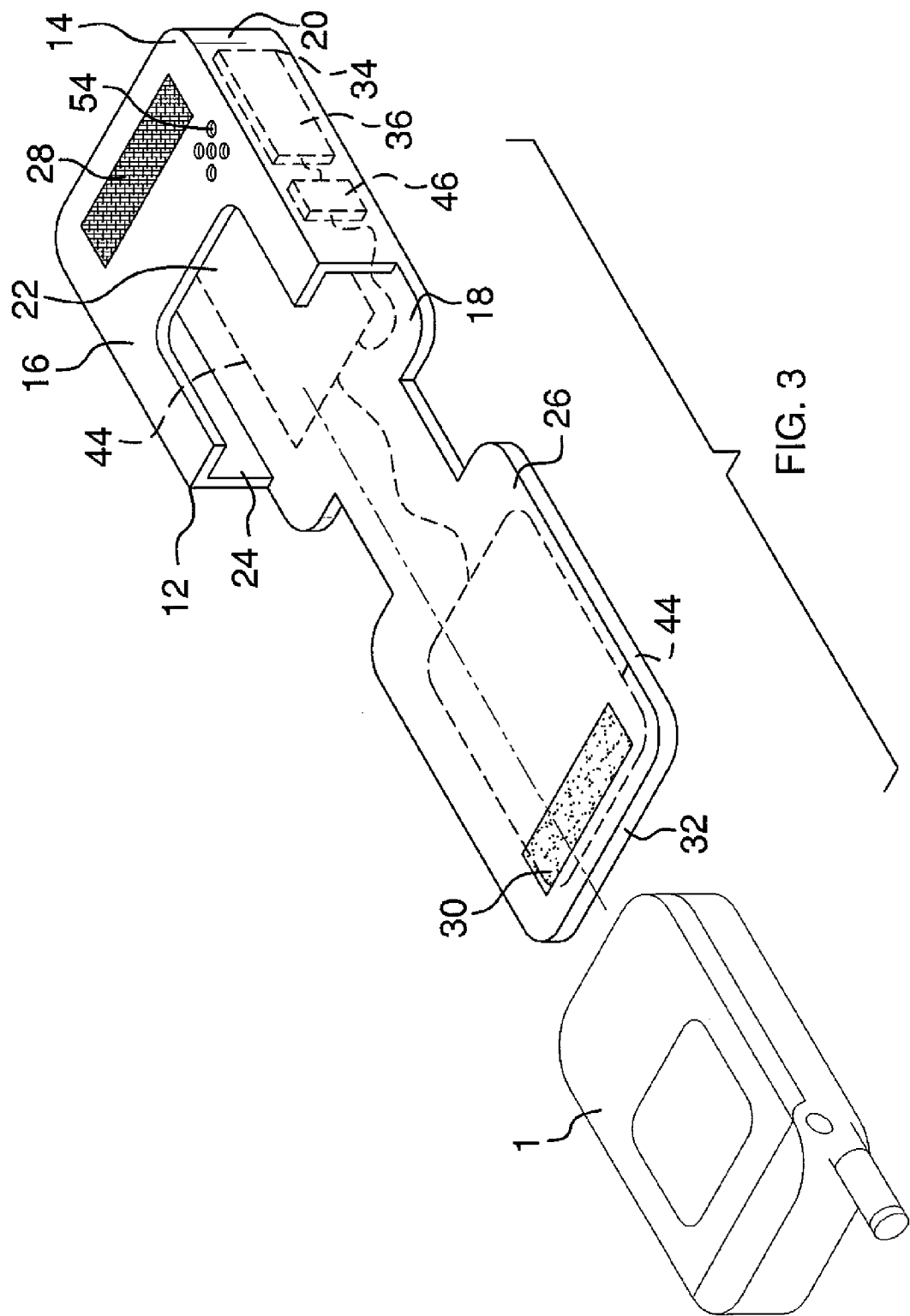
FIG. 3 is a top exploded perspective view of the present invention.
Figure 4:
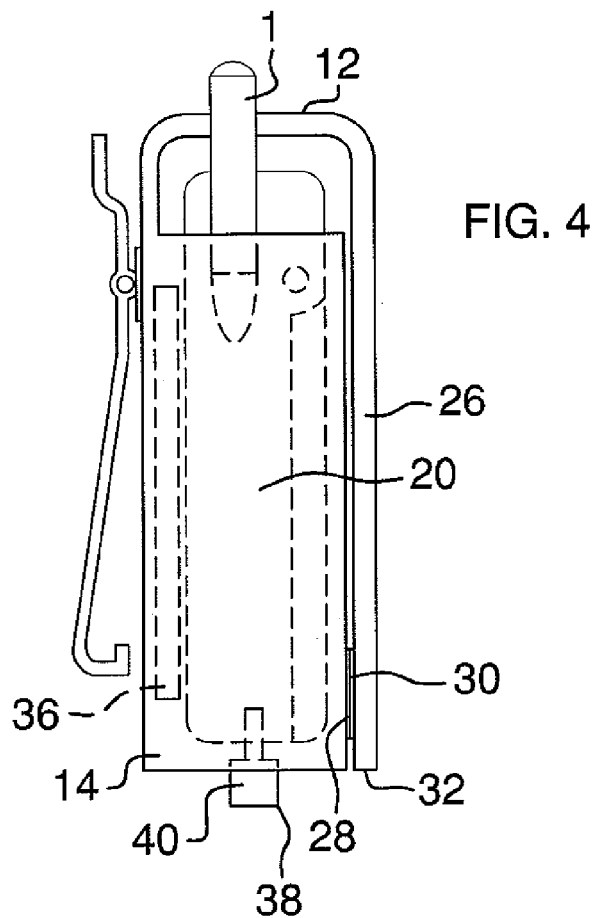
FIG. 4 is a side view of the present invention.
Figure 5:
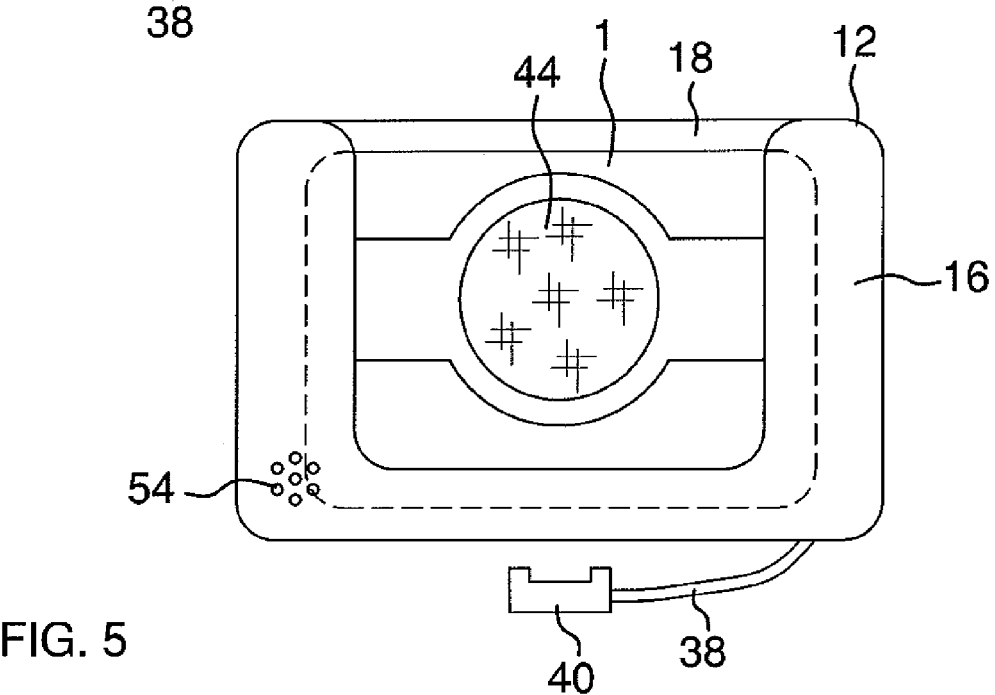
FIG. 5 is a front view of an embodiment of the present invention used for pagers.
Figure 8:
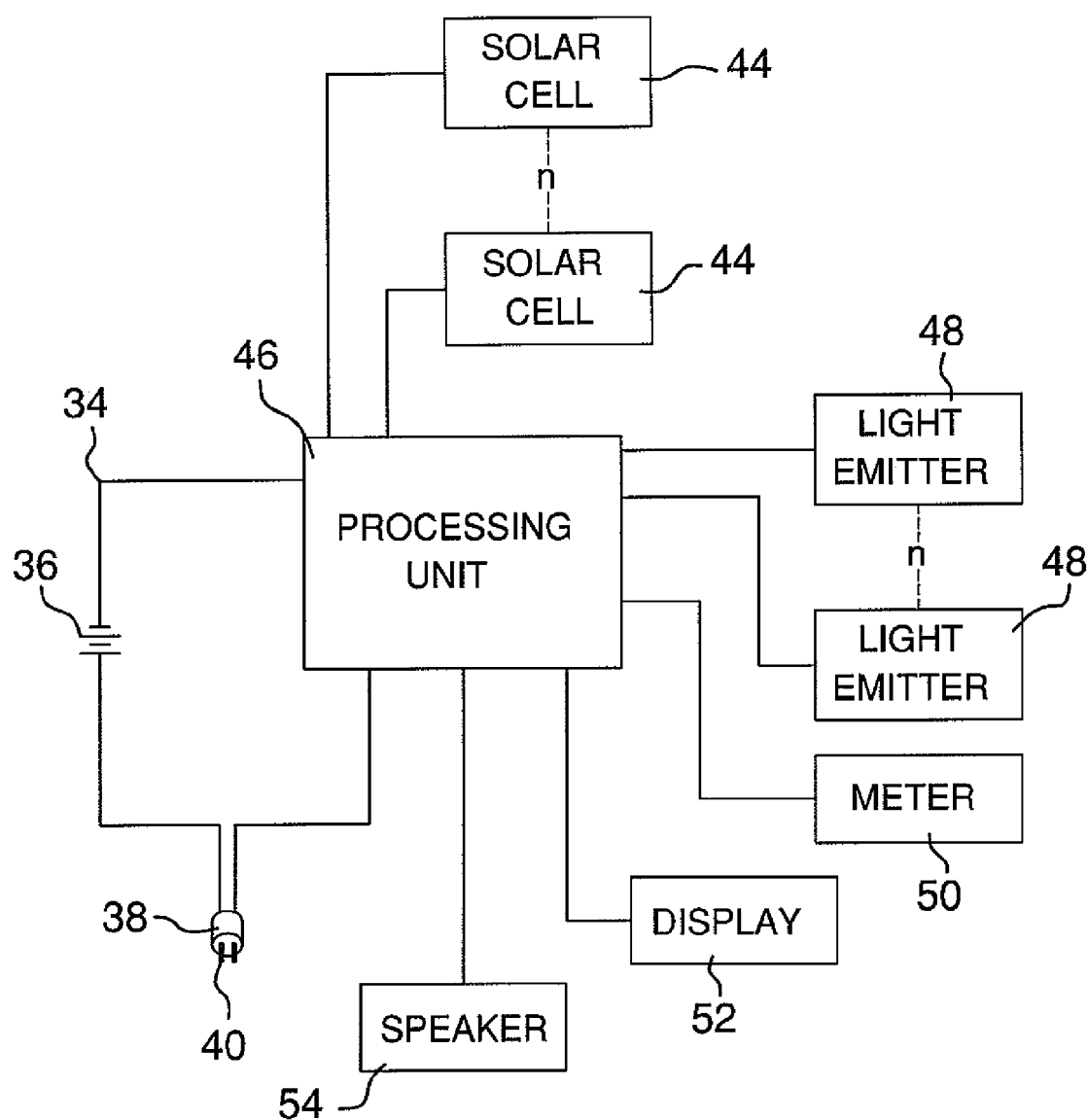
FIG. 8 is a schematic view of the recharging assembly of the present invention.

The recharging assembly 34 also includes at least one solar cell 44 coupled to the case 12. The at least one solar cell 44 is electrically coupled to the battery pack 36. The at least one solar cell 44 converts solar energy into electrical energy to recharge the battery pack 36. As shown in FIGS. 1 and 2, multiple solar cells 44 may be used to allow a greater chance of one of the solar cells 44 being exposed to light and to produce more electricity to recharge the battery pack 36. A processing unit 46 is electrically coupled to the battery pack 36 to control flow of power between the battery pack 36 and the electronic device 1. At least one light emitter 48 is coupled to the case 12 and positioned adjacent the at least one solar cell 44. The at least one light emitter 48 is electrically coupled to the processing unit 46. The processing unit 46 actuates the at least one light emitter 48 to emit light to facilitate location of the case 12 at night.

The recharging assembly 34 additionally includes a meter 50 mounted to the case 12 to be viewed. The meter 50 is electrically coupled to the processing unit 46 to indicate an amount of power available in the battery pack 36. A display 52 is coupled to the case 12 to be viewed. The display 52 is electrically coupled to the processing unit 46 to display a time of day. A speaker 54 is coupled to the case 12. The speaker 54 is electrically coupled to the processing unit 46. The speaker 54 emits an audible tone to alert a user when the case 12 has not been moved for a predetermined amount of time. Additionally, the speaker 54 can emit additional audible tones to signal a variety of conditions, such as the electronic device 1 being fully recharged and other appropriate conditions.

In use, the electronic device 1 is positioned in the sleeve 14. The free end 40 of the connecting cable 38 is extended through the aperture 42 in the case 12 and connected to the electronic device 1. The processing unit 46 controls the flow of power from the battery pack 36 to the electronic device 1 to recharge the electronic device 1. As the case 12 is exposed to light the at least one solar cell 44 converts the solar energy to electrical energy to recharge the battery pack 36.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A recharging cover system for recharging an electronic device, said system comprising:
   a case receiving the electronic device to protect the electronic device from being inadvertently damaged, said case including a sleeve receiving the electronic device, said sleeve having a front wall, a back wall and a perimeter wall extending between said front wall and said back wall to define an interior space to receive the electronic device, said sleeve having an open top end to permit insertion of the electronic device into said interior space of said case, said case including a cover being hingedly coupled to said back wall, said cover being pivoted over said open top end and positioned adjacent said front wall when the electronic device is to be secured in said case; and
   a recharging assembly being positioned in said case, said recharging assembly being electrically coupled to the electronic device to recharge the electronic device when the electronic device is positioned in said case.

2. The system according to claim 1, further comprising a first portion of hook and loop fastener being coupled to said front wall of said case, a second portion of hook and loop fastener being coupled to said cover adjacent a free end of said cover, said first portion of hook and loop fastener being releasably secured to said second portion of hook and loop fastener to secure said cover over said front wall.

3. The system according to claim 1, wherein said recharging assembly includes a battery pack being positioned in said case, said battery pack being electrically coupled to the electronic device to recharge the electronic device.

4. The system according to claim 3, wherein said recharging assembly includes a connecting cable being electrically coupled to said battery pack, said connecting cable extending from said case, a free end of said connecting cable being inserted through an aperture in said case and electrically coupled to the electronic device to allow power to be transferred from said battery pack to the electronic device.

5. The system according to claim 3, wherein said recharging assembly includes at least one solar cell being coupled to said case, said at least one solar cell being electrically coupled to said battery pack, said at least one solar cell converting solar energy into electrical energy to recharge said battery pack.

6. The system according to claim 5, further including a clip being attached to said case.

7. The system according to claim 5, wherein said recharging assembly includes a processing unit being electrically coupled to said battery pack to control flow of power between said battery pack and the electronic device.

8. The system according to claim 7, wherein said recharging assembly includes at least one light emitter being coupled to said case and positioned adjacent said at least one solar cell, said at least one light emitter being electrically coupled to said processing unit, said processing unit actuating said at least one light emitter to emit light to facilitate location of said case at night.

9. The system according to claim 7, wherein said recharging assembly includes a meter being mounted to said case to be viewed, said meter being electrically coupled to said processing unit to indicate an amount of power available in said battery pack.

10. The system according to claim 7, wherein said recharging assembly includes a display being coupled to said case to be viewed, said display being electrically coupled to said processing unit to display a time of day.

11. The system according to claim 7, wherein said recharging assembly includes a speaker being coupled to said case, said speaker being electrically coupled to said processing unit, said speaker emitting at least one audible tone to alert a user when said processing assembly detects one of a predetermined conditions.

12. A recharging cover system for recharging an electronic device, said system comprising:
   a case receiving the electronic device to protect the electronic device from being inadvertently damaged, said case including a sleeve receiving the electronic device, said sleeve including a front wall, a back wall and a perimeter wall extending between said front wall and said back wall to define an interior space to receive the electronic device, said sleeve having an open top end to permit insertion of the electronic device into said interior space of said case, said case including a cover being hingedly coupled to said back wall, said cover being pivoted over said open top end and positioned adjacent said front wall when the electronic device is to be secured in said case;
   a recharging assembly being positioned in said case, said recharging assembly being electrically coupled to the electronic device to recharge the electronic device when the electronic device is positioned in said case, said recharging assembly comprising;
      a battery pack being positioned in said case, said battery pack being electrically coupled to the electronic device to recharge the electronic device;
      a connecting cable being electrically coupled to said battery pack, said connecting cable extending from said case, a free end of said connecting cable being inserted through an aperture in said perimeter wall and electrically coupled to the electronic device to allow power to be transferred from said battery pack to the electronic device;
      at least one solar cell being coupled to said case, said at least one solar cell being electrically coupled to said battery pack, said at least one solar cell converting solar energy into electrical energy to recharge said battery pack;
      a processing unit being electrically coupled to said battery pack to control flow of power between said battery pack and the electronic device;

at least one light emitter being coupled to said case and positioned adjacent said at least one solar cell, said at least one light emitter being electrically coupled to said processing unit, said processing unit actuating said at least one light emitter to emit light to facilitate location of said case at night;

a meter being mounted to said case to be viewed, said meter being electrically coupled to said processing unit to indicate an amount of power available in said battery pack;

a display being coupled to said case to be viewed, said display being electrically coupled to said processing unit to display a time of day;

a speaker being coupled to said case, said speaker being electrically coupled to said processing unit, said speaker emitting an audible tone to alert a user when said processing assembly detects one of a predetermined conditions; and a first portion of hook and loop fastener being coupled to said front wall of said case, a second portion of hook and loop fastener being coupled to said cover adjacent a free end of said cover, said first portion of hook and loop fastener being releasably secured to said second portion of hook and loop fastener to secure said cover over said front wall.

13. The system according to claim 1, wherein said recharging assembly includes a speaker being coupled to said case, said speaker being electrically coupled to said processing unit, said speaker emitting at least one audible tone to alert a user when said case has not be moved for a predetermined amount of time.

14. The system according to claim 12, wherein said recharging assembly includes a speaker being coupled to said case, said speaker being electrically coupled to said processing unit, said speaker emitting at least one audible tone to alert a user when said case has not be moved for a predetermined amount of time.

15. The system according to claim 14, further including a clip being attached to said case.

* * * * *